United States Patent [19]

Brennan et al.

[11] 4,439,546

[45] Mar. 27, 1984

[54] SCRAP RIM POLYURETHANE MODIFIED EXTENDER POLYOLS

[75] Inventors: Michael E. Brennan; Doris M. Rice, both of Austin, Tex.

[73] Assignee: Texaco Inc., White Plains, N.Y.

[21] Appl. No.: 520,884

[22] Filed: Aug. 5, 1983

[51] Int. Cl.$^3$ ............................................. C08L 67/02
[52] U.S. Cl. ..................................... 521/48; 521/48.5; 521/49; 521/49.5; 525/440
[58] Field of Search ................. 521/48, 48.5, 49, 49.5; 525/440

[56] References Cited

U.S. PATENT DOCUMENTS 4,159,972  7/1979  Braslaw et al. ..................... 521/49.5
4,166,896  9/1979  Warner ................................ 525/444

*Primary Examiner*—Maurice J. Welsh

*Attorney, Agent, or Firm*—Jack H. Park; Kenneth R. Priem; David L. Mossman

[57] ABSTRACT

Mixtures of aromatic polyols containing ester functionalities suitable for use as polyol extenders in polyurethane foams prepared by reacting dibasic acid residues with an alkylene glycol residue, the reaction product of which is reacted with recycled polyethylene terephthalate into which scrap RIM is dissolved, are described. Scrap RIM is recycled reaction injection molded polyurethane material which has been chopped or pulverized. From about 10 to 50 wt. % of the resulting modified extender polyol mixture may be scrap RIM. Surprisingly, the process is non-catalytic. These novel polyols may be blended with conventional polyols to yield excellent rigid foams, thus serving as useful polyol extenders.

20 Claims, No Drawings

SCRAP RIM POLYURETHANE MODIFIED EXTENDER POLYOLS

CROSS-REFERENCE TO RELATED APPLICATION

This application is related to U.S. Pat. application Ser. No. 443,778 filed on Nov. 22, 1982, which relates to polyol production from the reaction of polyethylene terephthalate residues with the reaction product of dibasic acid residue and alkylene glycol.

BACKGROUND OF THE INVENTION

1. Field of the Invention

The invention relates to polyols for rigid polyurethane foams and more particularly relates to such aromatic polyester polyols which are made from the waste streams of dibasic acids, alkylene glycols, recycled or scrap polyethylene terephthalate and scrap reaction injection molded polyurethane.

2. Description of Other Relevant Compounds in the Field

It is known to prepare polyurethane foam by the reaction of polyisocyanate, a polyol and a blowing agent such as a halogenated hydrocarbon, water or both, in the presence of a catalyst. One particular area of polyurethane technology is based upon rigid polyurethane foams.

Rigid foams generally have good insulative properties and are thus desirable for use in building insulation. As with all building materials, it is desirable to provide rigid foams that are as fire resistant as possible. One approach to this goal is to modify the polyol.

Polyisocyanurate foams are a type which are considered to be fire resistant and show low smoke evolution on burning. However, polyisocyanurate foams tend to be brittle or friable. Various types of polyols have been devised to lower the foam friability, but what frequently happens is that the fire and smoke properties of the polyisocyanurate foam deteriorate. Thus, a fine balance exists between the amount and type of polyol one adds to a polyisocyanurate foam formulation in order to maintain maximum flame and smoke resistance while at the same time reach an improvement in foam friability. U.S. Pat. Nos. 4,039,487 and 4,092,276 describe attempts at this fine balance, although each has its disadvantages.

The recovery of polyalkylene terephthalate scrap or residues has long been practiced. U.S. Pat. No. 3,344,091 describes a process for converting scrap polyester, such as polyethylene terephthalate (PET) into active prepolymer particles by mixing the scrap PET with the glycol originally used in preparing PET, with or without the additional presence of a lower dialkyl ester of the aromatic dicarboxylic acid whose dehydroxylated residues are present in the scrap PET. Chemical Abstracts (CA), vol. 84, paragraph 5638h, relates that British Pat. No. 1,458,486 teaches dialkyl terephthalates, such as dimethyl terephthalate (DMT), recovery by heating scrap PET with monohydric alcohols with a catalyst and a sequestering agent.

PET scrap may be recovered by depolymerization with glycols as seen in CA 78:160452n, abstract to East German Patent No. 92,801. U.S. Pat. No. 4,166,896 teaches that a mixture of glycols and oligomers (such as low molecular weight polyesters of terephthalic acid and a glycol) may be depolymerized (transesterified) by heating. Subsequently, ethylenically unsaturated dicarboxylic acids or their anhydrides are added and the mixture is heated again. An unsaturated polyester resin is produced. A suitable dicarboxylic acid is phthalic acid, the anhydride of which is also useful in this process.

Scrap polyalkylene terephthalate, such as polyethylene terephthalate is known to be incorporated into polyurethanes. For example, U.S. Pat. No. 4,048,104 relates that polyisocyanate prepolymers for use in polyurethane products may be prepared by combining an organic polyisocyanate with polyols which are the hydroxyl-terminated digestion products of waste polyalkylene terephthalate polymers and organic polyols. A polyol ingredient which is the digestion product of polyalkylene terephthalate residues or scraps digested with organic polyols is also described in U.S. Pat. No. 4,223,068. Another case where terephthalic acid residues are employed is outlined in U.S. Pat. No. 4,246,365 where polyurethanes are made from polyesters containing at least two hydroxyl groups and terephthalic acid residues.

More relevant to the compounds of this invention is the solution proposed in U.S. Pat. No. 4,237,238. In this patent, a polyol mixture is prepared by the transesterification of a residue from the manufacture of dimethyl terephthalate with a glycol, which is then used to produce polyisocyanurate foams having a combination of a high degree of fire resistance with low smoke evolution, low foam friability and high compressive strength. The preparation of such a polyol mixture (from ethylene glycol and dimethyl terephthalate esterified oxidate residue) is described in U.S. Pat. No. 3,647,759. J. M. Hughes and John Clinton, in the Proceedings of the S.P.I. 25th Annual Urethane Division Technical Conference, Scottsdale, Arizona (October 1979), describe other foams prepared from the polyols of U.S. Pat. No. 3,647,759.

U.S. Pat. No. 3,755,212 teaches air blown polyurethane foams prepared from ester-modified polyether polyols, a polyisocyanate and a polyurethane catalyst. The modifying agents for reaction with the polyols apparently are internal anhydrides of polycarboxylic acids, such as phthalic anhydride. Rigid polyurethane foams may be made from a fluid polyol made by hydrogenating a DMT process residue, then reacting the hydrogenation product with an alcoholic material, according to U.S. Pat. No. 3,892,796. Further, U.S. Pat. No. 4,186,257 reveals that high molecular weight polyurethanes from polyols linked with ester groups may be made by reacting diols with phthalic acid or DMT. Polybutylene terephthalate diols and polyhexamethylene terephthalate diols are also used.

Brominated ester-containing polyether polyols may be prepared by the sequential reaction of a polyether polyol with 4,5-dibromohexahydrophthalic anhydride and an alkylene oxide according to U.S. Pat. No. 4,069,207. Flame-retardant polyurethane foams are prepared using these modified polyols. Also relevant is East German Pat. No. 122,986 cited in CA 86:190834 which teaches that polyurethanes may be manufactured from polyester polyols made by condensation and transesterification of PET synthesis distillation residues with polyols, polyamino alcohols and fatty acid ester diols.

SUMMARY OF THE INVENTION

The invention concerns a mixture of scrap reaction injection molded polyurethane modified extender polyols being produced by the process comprising reacting a dibasic acid with an alkylene glycol and recycled polyethylene terephthalate in the presence of scrap reaction injection molded polyurethane.

DETAILED DESCRIPTION OF THE PREFERRED EMBODIMENTS

In general, it has been discovered that polyurethane foams, particularly rigid foams, may be made using the mixture of aromatic polyester polyols of this invention either alone or as polyol extenders together with other polyols. In addition, such a polyol mixture is compatible with the trichlorofluoromethane blowing agent, a problem with prior art polyol extenders. The novel aromatic polyester polyol mixtures are made by using recycled polyethylene terephthalate (PET). This may be any scrap residue from old polyethylene terephthalate which contains compounds which have the moiety

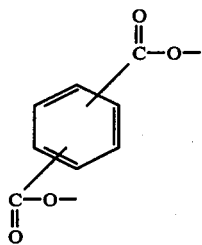

Generally, the scrap or recycled polyethylene terephthalate may be in any particulate form. A frequently seen form is fragmentized soft drink bottles which appear as clear or colored chips. Polyethylene terephthalate film can also be recycled. Any chopping or pulverizing process which produces small bits of solid PET from the larger, waste recycled article would be appropriate to produce scrap PET useful herein. Sometimes the scrap PET is mixed with a solvent to make a kind of slurry. While scrap PET slurry could be used in the method of this invention, the recycled PET chips without the solvent is also useful.

The polyester polyol with which the polyethylene terephthalate scrap is reacted is produced by the esterification of a residue of dibasic acid manufacture, as noted before. Dibasic acids are those acids which have two displaceable hydrogen atoms. Examples of such acids are succinic, glutaric and adipic acid. Especially preferred are the residues from adipic acid manufacture which contain portions of each of the three acids listed above. It is necessary that the acids be dibasic so that polymer chains can be formed upon reaction with the glycol. These materials may also include waste dicarboxylic acids.

Preferably, the alkylene glycol has the formula

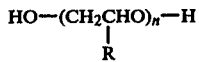

where R is hydrogen or lower alkyl of one to four carbon atoms and n is from 1 to 3. Glycols which meet this definition are ethylene glycol, propylene glycol (1,2-propylene glycol), diethylene glycol (DEG), dipropylene glycol, and triethylene glycol (TEG), among others. The glycol may be a residue or flash-separated glycol.

The polyester polyol which results from the reaction of the dibasic acid residue and an alkylene glycol, such as DEG, may be a diester diol. Such a diol may be defined by the formula

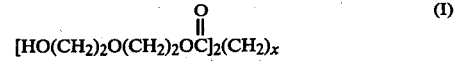

where x is 2 to 4.

The proportions of the reactants should be such as to give a resulting mixture of aromatic polyester polyols which have an average OH (hydroxyl) number within the desired range of about 100 to 400. The saponification number of the scrap polyethylene terephthalate (a measure of transesterification sites) should be considered in selecting proportions, if obtainable. One PET unit has a molecular weight of 192.2. Preferably the approximate mole ratio of scrap polyethylene terephthalate to dibasic acid to alkylene glycol may be about 1:1:2. These proportions could vary 5% in either direction. What actually forms the "polyol" of this invention is a mixture of polyols having ester functions, even though the mixture is sometimes referred to as a singular "polyol".

A preferred embodiment of these aromatic polyester polyols has the following approximate structure, known herein as formula (II):

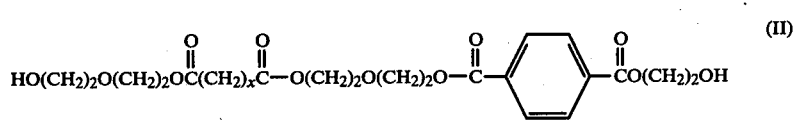

where x is an integer of from 2 to 4. The mixture that results from the process described has an average value of x of around 3.

Generally, both reactions need heat between ambient and about 300° C. to proceed. Preferably, the temperature for both steps should be between 140° and 220° C. Unlike some prior art processes, both steps are non-catalytic. The pressure can be atmospheric, subatmospheric or autogenous. The polyol should have a hydroxyl number in the range of 100 to 400, with an especially preferred hydroxyl number range of 125 to 300.

The improvement of the instant invention involves adding scrap reaction injection molding (RIM) polyurethane to the aromatic polyester polyol extender described above, which is the subject of U.S. Pat. application Ser. No. 443,778 filed on Nov. 22, 1982. The scrap RIM may be added to the finished aromatic polyester polyol extender such as the one portrayed in formula (II). However, scrap RIM is even more soluble in the precursor to the finished product, the bis-ester diol suggested by the structure of formula (I). The recycled PET component would then be reacted with the intermediate diol containing the RIM and the mixture processed normally as described above.

RIM polyurethane is the reaction product of a high molecular weight polyhydric polyether, a low molecular weight active hydrogen containing compound of at least two functionality and a polyisocyanate. A RIM machine is used to inject the reactants into a mold where they react to make an article of RIM polyurethane elastomer. Reaction injection molded elastomers are useful as molded articles of commerce. One of the most important uses is as automotive body parts. For more information on RIM polyurethanes, see the numerous patents and articles in the field, particularly U.S. Pat. Nos. 4,243,760; 4,254,069; 4,272,618 and 4,297,444, incorporated by reference herein.

The scrap RIM should be pelletized in the same manner as the recycled PET described above. The proportion of scrap RIM in total aromatic polyester polyol should be from 10 to 50 wt.% with the aromatic polyester polyol being the balance, 90 to 50 wt.%. The scrap RIM is added preferably at a temperature between 170° and 250° C., or at an especially preferred temperature in the range of 180° to 220° C. As noted above, the scrap RIM may be added during various stages in the processing of the aromatic polyester polyol at appropriate temperatures. This invention thus provides an economical extender polyol that utilizes two kinds of recycled polymer. More accurately, the products of this invention are mixtures of scrap RIM modified aromatic polyester polyols.

These mixtures can serve as polyol extenders when they are blended with conventional polyols for use in polyurethane foams. The polyols of this invention can also be used alone to prepare isocyanurate foams.

There is good compatibility of the polyols of this invention with trichlorofluoromethane. Trichlorofluoromethane, sold under the tradename FREON® R11B, a conventional blowing agent, is the gas entrapped in closed-cell rigid foams which accounts for the excellent insulating properties of these foams.

The second constituent of the overall polyol combination found particularly useful in preparing rigid polyurethane foams is a polyether polyol having a hydroxyl number of 200–800. Usually the polyether polyol comprises 0–95 percent by weight of the total polyol combination weight. Preferred polyether polyols of this type are the reaction products of a polyfunctional active hydrogen initiator and propylene oxide, ethylene oxide or mixed propylene oxide and ethylene oxide. The polyfunctional active hydrogen initiator most preferably has a functionality of 2–8.

A wide variety of initiators may be alkoxylated to form useful polyether polyols. Thus, for example, polyfunctional amines and alcohols of the following type may be alkoxylated: monoethanolamine, diethanolamine, triethanolamine, ethylene glycol, polyethylene glycol, propylene glycol, polypropylene glycol, glycerine, sorbitol, trimethylolpropane, sucrose and alphamethyl glucoside.

Such above amines or alcohols may be reacted with an alkylene oxide such as ethylene oxide, propylene oxide, or mixed ethylene oxide and propylene oxide using techniques known to those skilled in the art. Thus, for example, the reaction of alkylene oxide with initiators of this type is set forth in U.S. Pat. Nos. 2,948,757 and 3,000,963. Essentially such alkoxylations are carried out in the presence of a basic catalyst at a temperature sufficient to sustain the reaction. The hydroxyl number which is desired for the finished polyol would determine the amount of alkylene oxide used to react with the initiator. As noted above, the polyether polyols useful here have a hydroxyl number ranging from about 200 to about 800. The reaction mixture is then neutralized and water and excess reactants are stripped from the polyol. The polyether polyol may be prepared by reacting the initiator with propylene oxide or ethylene oxide, or by reacting the initiator first with propylene oxide followed by ethylene oxide or vice versa in one or more sequences to give a so-called block polymer chain or by reacting the initiator at once with propylene oxide and ethylene oxide mixture to achieve a random distribution of such alkylene oxides.

Especially preferred as the second polyol constituent are the nitrogen-containing polyether polyols described in U.S. Pat. Nos. 3,297,597 and 4,137,265, incorporated by reference herein. These particularly preferred polyols are marketed by Texaco Chemical Company as THANOL® R-350-X and THANOL R-650-X polyols. These polyols are prepared by reacting from 2 to 3 moles of propylene oxide with one mole of the Mannich reaction product of a mole of phenol or nonylphenol with one or two moles of diethanolamine and formaldehyde.

The final polyol combination more preferably comprises 0–95 percent by weight of said polyether polyol and 100–5 percent by weight of scrap RIM modified aromatic polyester polyol. Although the aromatic polyols of this invention may be used alone, it is preferred that they be present in an amount of from 30 to 70 wt.% of the polyol blend. The polyol combination in many instances has a total hydroxyl number ranging from about 100 to about 500.

Any aromatic polyisocyanate may be used in the practice of the instant invention. Typical aromatic polyisocyanates include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl)methane, bis(3-methyl-4-isocyanatophenyl)methane, and 4,4'-diphenylpropane diisocyanate.

Greatly preferred aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents; for example, U.S. Pat. Nos. 2,683,730; 2,950,263; 3,012,008; 3,344,162; and 3,362,979.

Most preferred methylene-bridged polyphenyl polyisocyanate mixtures used here contain from about 20 to about 100 wt.% methylene diphenyl diisocyanate isomers with the remainder being polymethylene polyphenyl diisocyanates having higher functionalities and higher molecular weights. Typical of these are polyphenyl polyisocyanate mixtures containing about 20 to 100 wt.% methylene diphenyl diisocyanate isomers, of which 20 to about 95 wt.% thereof is the 4,4'-isomer with the remainder being polymethylene polyphenyl polyisocyanates of higher molecular weight and functionality that have an average functionality of from about 2.1 to about 3.5. The isocyanate mixtures are known commercially available materials and can be prepared by the process described in U.S. Pat. No. 3,362,979, issued Jan. 9, 1968 to Floyd E. Bentley.

In the production of rigid polyurethane foams in the practice of the invention, other known additives are necessary. One such constituent is the blowing agent. Some examples of such material are trichloromonofluoromethane, dichlorodifluoromethane, dichloromonofluoromethane, 1,1-dichloro-1-fluoroethane, 1,1-difluoro-1,2,2-trichloroethane, chloropentafluoroethane, and the like. Other useful blowing agents include low-boiling hydrocarbons such as butane, pentane, hexane, cyclohexane, and the like. See U.S. Pat. No. 3,072,582, for example. The polyols of this invention are quite compatible with fluorocarbon blowing agents unlike some of the prior art polyols which are made from DMT residues.

Surfactant agents, better known as silicone oils, are added to serve as a cell stabilizer. Some representative materials are sold under the names of SF-1109, L-520, L-521 and DC-193 which are, generally, polysiloxane polyoxyalkylene blocked co-polymers, such as those disclosed in U.S. Pat. Nos. 2,834,748; 2,917,480; and 2,846,458, for example.

Should fire retardancy be required for the polyurethane foam, two types of fire retardants are available; those that are incorporated by mere mechanical mixing and those that become chemically bound in the polymer chain. Representative of the first type are tris(chloroethyl)phosphate, tris(2,3-dibromopropyl)phosphate, diammonium phosphate, various halogenated compounds and antimony oxide. Representative of the chemically bound type are chlorendic acid derivatives, and various phosphorous-containing polyols.

The catalysts which may be used to make the foams of this invention are well known. There are two general types of catalyst, tertiary amines and organometallic compounds. Examples of suitable tertiary amines, used either individually or in mixture, are the N-alkylmorpholines, N-alkylalkanolamines, N,N-dialkylcyclohexylamines and alkylamines where the alkyl groups are methyl, ethyl, propyl, butyl, etc. Examples of specific tertiary amine catalysts useful in this invention are triethylenediamine, tetramethylethylenediamine, triethylamine, tripropylamine, tributylamine, triamylamine, pyridine, quinoline, dimethylpiperazine, dimethylhexahydroaniline, piperazine, N-ethylmorpholine, 2-methylpiperazine, dimethylaniline, nicotine, dimethylaminoethanol, tetramethylpropanediamine and methyltriethylenediamine. Useful organometallic compounds as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc. Selection of the individual catalysts and proportions to use in the polyurethane reaction are well within the knowledge of those skilled in the art, and an amine and organometallic compound are often used together in the polyurethane reaction.

The rigid polyurethane foams prepared here can be made in one step by reacting all the ingredients together at once (one-shot process) or the rigid foams can be made by the so-called "quasi-prepolymer method." In accordance with this method, a portion of the polyol component is reacted in the absence of a catalyst with the polyisocyanate component in proportion so as to provide from about 20 percent to about 40 percent of free isocyanato groups in the reaction product, based on the polyol. To prepare foam, the remaining portion of the polyol is added and the two components are allowed to react in the presence of a catalyst and other appropriate additives such as blowing agents, foam stabilizing agents, fire retardants, etc. The blowing agent, the foam stabilizing agent, the fire retardant, etc., may be added to either the prepolymer or remaining polyol, or both, prior to the mixing of the component, whereby at the end of the reaction a rigid polyurethane foam is provided.

In a preferred embodiment the amount of polyol combination is used such that the isocyanato groups are present in the foam in at least an equivalent amount, and preferably in excess, compared with the free hydroxyl groups. Preferably, the ingredients will be proportional so as to provide for about 1.05 to about 8.0 mole equivalents of isocyanato groups per mole equivalent of hydroxyl groups.

The invention will be illustrated further with respect to the following specific examples, which are given by way of illustration and not given as limitations on the scope of this invention. The synthesis of the polyols of this invention will be presented along with examples of how these polyol mixtures are used as polyol extenders to prepare foams.

It may be readily seen from the examples that the polyol mixtures of this invention work as well in the role of polyol extenders as do commercially available materials. Many modifications may be made in the polyol mixtures of this invention and their method of production without departing from the spirit and scope of the invention which is defined only in the appended claims. For example, one skilled in the art could adjust the temperature, pressure, proportions and modes of additions to provide polyol mixtures that give foams with optimal properties.

The first two examples will illustrate the preparation of mixtures of aromatic polyester polyols before any modification with scrap RIM.

ESTERIFICATIONS OF WASTE DIBASIC ACID STREAMS

Example 1

Diethylene Glycol (DEG)

A 2-liter three-neck round bottom flask, equipped with a thermometer (Therm-O-Watch), magnetic stirring bar, nitrogen inlet, distillation head with water cooled condenser and a tared receiver, was charged with 521.8g (4.04 moles) of DuPont solid dibasic acid (DBA; 56% glutaric acid, 23% succinic acid, 20% adipic acid, ~1% organic nitrogen compounds, ~0.2% nitric acid; 868.22 acid no., 0.41% N, 0.82% water, 221 ppm copper and 162 ppm vanadium) and 857.2g (8.08 moles) DEG. The whole was then stirred and heated under nitrogen. The reaction solution became homogeneous at 100° C. Distillate (132.0g; 98.1% water) was collected overhead at 85°-99° C./144°-215° C. (pot)/1 atmosphere over 3⅔ hours. The bottoms product (1244.0g), a dark mobile liquid, was recovered after cooling under nitrogen to room temperature. Total recovery was 99.78%. Proton nuclear magnetic resonance spectra confirmed the product structure to be a diester diol of formula (I). The product analyzed as follows:

| Hydroxyl number | 368 |
|---|---|
| Acid number | 26.12 |
| Saponification number | 342.06 |
| Water, % | 0.83 |
| Nitrogen, % | 0.07 |
| Viscosity, cs, 25° C. | 165 |
| Copper, ppm | 47.2 |
| Vanadium, ppm | 27.3 |

Prior art references report hydroxyl numbers of 327 (viscosity, 210 cp at 25° C.) and 365±5 for a product prepared by tetraoctyl titanate catalyzed transesterification of dimethyl glutarate with DEG (150°–225° C., 16 hours), see U.S. Pat. No. 4,048,104.

CLEAVAGE/ESTERIFICATIONS OF RECYCLED PET

Example 2

PET/DBA-DEG Diester Diol (Mole ratio = 1/1)

A 1-liter three-neck round bottom flask, equipped with a mechanical stirrer, thermometer (Therm-O-Watch), water cooled distillation head, nitrogen inlet and a tared receiver was charged with 232.0g (1.2 equiv.) PET chips (green and clear from recycled soft drink bottles) and 368.0g (1.2 moles) of DBA-DEG diester diol from Example 1. The whole was then stirred and heated under a nitrogen atmosphere at 1 atmosphere pressure to 210° C. over 1.0 hour and then held at 210°–220°C. for 6.0 hours. A small amount of distillate (3.9g; expected 3.0g water from Example 1) was collected during the total reaction time at 71°–44° C./200°–220° C. (pot). The product (592.0g), a dark, mobile liquid, was recovered after cooling to near room temperature under nitrogen. Total recovery was 99.3%. Analyses of product and the prior art product (dimethyl glutarate derived) follow:

|  | Example III | CHEMPOL 30-2150 |
|---|---|---|
| Hydroxyl number | 231 | 210 |
| Acid number | 4.45 | 1.76 |
| Saponification number | 438.09 | 431.33 |
| Water, % | 0.23 | 0.05 |
| Viscosity, cs, 25° C. | 3,564 | 3,529 |
| Copper, ppm | 18.1 | — |
| Vanadium, ppm | 25.3 | — |
| Titanium, ppm | — | 439 |

The scrap RIM material used in the following examples was made from a formulation of THANOL® SF-6503 (a 6500 molecular weight polyether triol containing oxyethylene groups and approximately 90% primary hydroxyl groups, made by Texaco Chemical Company), ethylene glycol, L-5430 Silicone Oil (a silicone glycol co-polymer surfactant containing reactive hydroxyl groups, made by Union Carbide), dibutyltin dilaurate, trichlorofluoromethane blowing agent and ISONATE® 143L [pure methylene bis(4-phenylisocyanate), MDI, modified so that it is a liquid at temperatures where MDI normally crystallizes, made by the Upjohn Company].

The bis-ester diol used in Example 4 was made in situ much as in the manner of Example 1, and had a hydroxyl number of 368 and a viscosity of 165 to 195 centistokes (cs) at 25° C. Serving as the finished aromatic polyester polyol product in Example 3 is THANOL R-510, made by Texaco Chemical Company, which has a structure like formula (II), a hydroxyl number of 226 and a viscosity of 4400 cs at 25° C. It was prepared by a procedure similar to that of Example 2.

Example 3

THANOL R-510/RIM, 90:10 wt.%

A 1-liter three-neck round bottom flask, equipped with a mechanical stirrer, thermometer (Therm-O-Watch), nitrogen inlet, water cooled distillation head and a tared receiver, was charged with 450.0g of THANOL R-510 and 50.0 g RIM material. This heterogeneous mixture was stirred well and heated under $N_2$ to 220° C. maximum over 1⅔ hours and held 1.0 hour. The RIM material appeared to dissolve at 190°–200° C. over about a 15 minute period. A small amount (1–2 drops) of distillate was discarded. The reaction solution was cooled to near room temperature and 498.0 g of a dark, viscous liquid product was isolated. Analyses follow.

| Hydroxyl number | 201 |
|---|---|
| Acid number | 2.03 |
| Saponification number | 409.19 |
| Water, % | 0.02 |
| Viscosity (25° C.), cs | 9,764 |

Example 4

Bis-Esterdiol/RIM, 80:20 wt.

Using the apparatus of Example 3 and the procedure of Example 1, the bis-ester diol with a structure of formula (I) was prepared from 172.0g (1.34 moles) of AGS flakes (Monsanto) and 283.8g (2.68 moles) of diethylene glycol (DEG). AGS typically contains 13–18% adipic acid, 55–59% glutaric acid, 22–24% succinic acid, 0.2–1.4% other dibasic acids, 0.1–1.0% monobasic acids, 0.1–0.3% picric acid, 2–3% other organics and 0.01–0.2% nitric acid. Water (48 ml) of esterification was collected as overhead distillate To this dark, mobile liquid product there was added 102.0g of RIM material and the resulting heterogeneous mixture was stirred well and heated under nitrogen to 220° C. maximum over 1 1/6 hours and held for 1.0 hour. The RIM material appeared to dissolve at 180°–200° C. over about 5–10 minute period. The product (507.5 g), a dark, mobile liquid, was isolated as before. Analyses follow.

| Hydroxyl number | 330 |
|---|---|
| Acid number | 3.96 |
| Saponification number | 258.48 |
| Water, % | 0.20 |
| Viscosity (25° C.), cs | 873 |

Example 5

Polyurethane and Polyisocyanurate Foams

Each experimental polyol was used as an extender in THANOL R-350-X and THANOL R-650-X in polyurethane formulations and as the sole polyol in polyisocyanurate formulations. Components were mixed at 2700 rpm and poured (600 g pour) into an 8"×8"×12" open mold and allowed to rise. The foams were allowed to stand for at least three days before determination of physical properties.

Formulations and physical properties are listed below.

|  | A | B | C | D | E | F |
|---|---|---|---|---|---|---|
| Formulation, pbw | | | | | | |
| THANOL R-350-X (OH = 534) | 25.7 | 24.5 | — | — | — | — |
| THANOL R-650-X (OH = 442) | — | — | 28.0 | 26.5 | — | — |
| Polyol, Ex. 3 (OH = 201) | 11.0 | — | 12.0 | — | 25.3 | — |
| Polyol, Ex. 4 (OH = 330) | — | 10.5 | — | 11.4 | — | 17.4 |
| Antiblaze 80[1] | 5.0 | 5.0 | 5.0 | 5.0 | — | — |
| Water | 0.2 | 0.2 | 0.2 | 0.2 | — | — |
| FREON R-11[2] | 12.0 | 12.0 | 12.0 | 12.0 | 12.0 | 12.0 |
| L-5420[3] | 0.5 | 0.5 | 0.5 | 0.5 | — | — |
| DC-193[4] | — | — | — | — | 0.5 | 0.5 |
| FOMREZ UL-32[5] | 0.01 | 0.01 | 0.01 | 0.01 | — | — |
| T-45[6] | — | — | — | — | 1.5 | 1.5 |
| MONDUR MR[7] (index = 1.2; 5.0) | 45.6 | 47.3 | 42.3 | 44.4 | 60.7 | 68.6 |
| Times (seconds), mixing | 8 | 8 | 6 | 6 | 4 | 4 |
| cream | 16 | 15 | 15 | 13 | 6 | 9 |
| gel | 54 | 49 | 53 | 42 | 22 | 26 |
| tack free | 74 | 69 | 67 | 58 | 31 | 33 |
| rise | 131 | 133 | 126 | 122 | 51 | 65 |
| Initial surface friability | None | None | None | None | Yes | Yes |
| Foam appearance | Good | Good | Good | Good | Good | Good |
| Physical Properties | | | | | | |
| Density (lbs/ft$^3$) | 1.91 | 1.93 | 1.99 | 1.98 | 2.09 | 1.98 |
| K-factor | 0.122 | 0.120 | 0.120 | 0.118 | 0.121 | 0.123 |
| Compressive strength, psi, | | | | | | |
| with rise | 43.81 | 41.59 | 43.11 | 42.10 | 42.30 | 29.08 |
| against rise | 14.77 | 15.12 | 16.16 | 15.21 | 19.41 | 15.90 |
| Heat distortion, °C. | 110 | 113 | 119 | 100 | >225 | >225 |
| Closed cells, % | 92.91 | 92.89 | 93.21 | 93.04 | 92.47 | 92.91 |
| Friability, % wt. loss, 10 min | 2.24 | 0.76 | 1.58 | 1.64 | 28.65 | 41.68 |
| ASTM 1692 Burn, in/min (BHA) | 1.57 | 1.78 | 1.57 | 1.76 | 1.45 | 1.38 |
| Butler Chimney Test | | | | | | |
| Flame height, in. | >11 | >11 | >11 | >11 | 6.17 | 6.00 |
| Sec. to extinguish | 35 | 30 | 13 | 27 | 10 | 10 |
| % wt. retained | 33.7[8] | 21.6[8] | 66.4 | 31.0[8] | 93.7 | 93.9 |

[1] Tris-(2-chloropropyl) phosphate) fire retardant made Mobil Chemical.
[2] Trichlorofluoromethane made by E. I. duPont de Nemours & Co.
[3] A silicone surfactant sold by Union Carbide Corp.
[4] Silicone surfactant sold by Dow-Corning.
[5] An organic tin catalyst sold by Witco Chemical Corp.
[6] Potassium octoate in glycol made by M & T Chemical Co.
[7] A polymeric isocyanate sold by Mobay Chemical Corp.
[8] These results are somewhat questionable.

We claim:

1. A mixture of scrap reaction injection molded polyurethane modified extender polyols, being produced by reacting a dibasic acid with an aklylene glycol and recycled polyethylene terephthalate in the presence of scrap reaction injection molded polyurethane.

2. The mixture of modified extender polyols of claim 1 in which the scrap injection molded polyurethane comprises 10 to 50 wt.% of the reaction components.

3. The mixture of modified extender polyols of claim 1 in which the reaction is conducted at a temperature in the range of 170° to 250° C. in the absence of a catalyst.

4. The mixture of modified extender polyols of claim 1 in which the dibasic acid is a waste stream which comprises one or more acids from the group consisting of glutaric acid, succinic acid and adipic acid.

5. The mixture of modified extender polyols of claim 1 in which the alkylene glycol has the formula $$HO-(CH_2CHO)_n-H$$
$$\phantom{HO-(CH_2C}|$$
$$\phantom{HO-(CH_2CH}R$$

where R is hydrogen or lower alkyl of 1 to 4 carbon atoms and n is from 1 to 3.

6. The mixture of modified extender polyols of claim 1 in which the approximate mole ratio of the reactants polyethylene terephthalate scrap: dibasic acid: aklylene glycol is 1:1:2.

7. The mixture of modified extender polyols of claim 1 in which the average hydroxyl number of the resultant mixture is between 100 and 400.

8. A mixture of scrap reaction injection molded polyurethane modified extender polyols having hydroxyl, aromatic and ester functionalities for use in preparing rigid foams, being produced by the process comprising
   a. esterifying, in the absence of a catalyst, a dibasic acid with an alkylene glycol to produce a polyester polyol,
   b. transesterifying, in the absence of a catalyst, recycled polyethylene terephthalate with the polyester polyol reaction product from the previous step to produce a mixture of aromatic polyester polyols, and c. dissolving scrap reaction injection molded polyurethane in the mixture of aromatic polyester polyols of the previous step.

9. The mixture of modified extender polyols of claim 8 in which the scrap reaction injection molded polyurethane comprises 10 to 50 wt.% of the total mixture.

10. The mixture of modified extender polyols of claim 8 in which the mixture is formed at a temperature in the range of from 170° to 250° C.

11. The mixture of modified extender polyols of claim 8 in which the dibasic acid is a waste stream which comprises one or more acids from the group consisting of glutaric acid, succinic acid and adipic acid.

12. The mixture of modified extender polyols of claim 8 in which the alkylene glycol has the formula $$HO-(CH_2CHO)_n-H$$
$$\phantom{HO-(CH_2CH}|$$
$$\phantom{HO-(CH_2CHO)_n-}R$$

where R is hydrogen or lower alkyl of 1 to 4 carbon atoms and n is from 1 to 3.

13. The mixture of modified extender polyols of claim 8 in which the approximate mole ratio of the reactants polyethylene terephthalate scrap:dibasic acid waste:alkylene glycol is 1:1:2.

14. The mixture of modified extender polyols of claim 8 in which the average hydroxyl number of the resultant mixture is between 100 and 400.

15. A mixture of scrap reaction injection molded polyurethane modified extender polyols having hydroxyl, aromatic and ester functionalities for use in preparing rigid foams, being produced by the process comprising a. esterifying, in the absence of a catalyst, a dibasic acid with an alkylene glycol to produce a polyester polyol, b. dissolving scrap reaction injection molded polyurethane in the polyester polyol, and c. transesterifying, in the absence of a catalyst, recycled polyethylene terephthalate with the polyester polyol reaction product from the previous step, such that the average hydroxyl number of the resultant modified extender polyol mixture is between 100 and 400.

16. The mixture of modified extender polyols of claim 15 in which the scrap reaction injection molded polyurethane comprises 10 to 50 wt.% of the reaction components.

17. The mixture of modified extender polyols of claim 15 in which the reaction is conducted at a temperature in the range of 170° to 250° C.

18. The mixture of modified extender polyols of claim 15 in which the dibasic acid is a waste stream which comprises one or more acids from the group consisting of glutaric acid, succinic acid and adipic acid.

19. The mixture of modified extender polyols of claim 15 in which the alkylene glycol is a glycol waste stream comprising alkylene glycols of the formula $$HO-(CH_2CHO)_n-H$$
$$\phantom{HO-(CH_2CH}|$$
$$\phantom{HO-(CH_2CHO)_n-}R$$

where R is hydrogen or lower alkyl of 1 to 4 carbon atoms and n is from 1 to 3, and 20. The mixture of modified extender polyols of claim 15 in which the approximate mole ratio of the reactants recycled polyethylene terephthalate:dibasic acid:alkylene glycol is 1:1:2.

* * * * *